US012762065B2

(12) United States Patent
Laurent et al.

(10) Patent No.: US 12,762,065 B2
(45) Date of Patent: Oct. 13, 2026

(54) MEMORY DEVICE HAVING A WRITE-BACK CACHE STORING CACHE DATA AND SCRUB DATA

(71) Applicant: Micron Technology, Inc., Boise, ID (US)

(72) Inventors: Christophe Vincent Antoine Laurent, Agrate Brianza (IT); Ferdinando Bedeschi, Biassono (IT)

(73) Assignee: Micron Technology, Inc., Boise, ID (US)

( * ) Notice: Subject to any disclaimer, the term of this patent is extended or adjusted under 35 U.S.C. 154(b) by 83 days.

(21) Appl. No.: 17/972,493

(22) Filed: Oct. 24, 2022

(65) Prior Publication Data

US 2024/0134802 A1 Apr. 25, 2024
US 2024/0232095 A9 Jul. 11, 2024

(51) Int. Cl.
*G06F 12/00* (2006.01)
*G06F 12/0891* (2016.01)

(52) U.S. Cl.
CPC .... *G06F 12/0891* (2013.01); *G06F 2212/305* (2013.01)

(58) Field of Classification Search
CPC ...... G06F 12/12; G06F 12/121; G06F 12/122; G06F 12/123; G06F 12/124; G06F 12/125; G06F 12/126; G06F 12/127; G06F 12/128
See application file for complete search history.

(56) References Cited

U.S. PATENT DOCUMENTS

| | | | | |
|---|---|---|---|---|
| 10,817,371 | B2 | 10/2020 | Rooney et al. | |
| 11,429,480 | B2 | 8/2022 | Hornung et al. | |
| 2011/0119558 | A1* | 5/2011 | Koshiyama | G06F 11/1048 714/E11.032 |
| 2012/0311405 | A1* | 12/2012 | Kanai | G06F 11/1064 714/763 |
| 2013/0073812 | A1* | 3/2013 | Kanai | G06F 12/0804 711/141 |
| 2016/0350237 | A1* | 12/2016 | Anantaraman | G06F 12/0868 |

OTHER PUBLICATIONS

Title: Memory Device With Data Scrubbing Capability and Methods, U.S. Appl. No. 17/684,112, filed Mar. 1, 2022, Inventors: Graziano Mirichigni, et al., Status: Docketed New Case—Ready for Examination, Status Date: Oct. 27, 2022.

* cited by examiner

*Primary Examiner* — Arvind Talukdar
(74) *Attorney, Agent, or Firm* — Greenberg Traurig

(57) ABSTRACT

Systems, methods, and apparatus for a memory device that stores a scrub list in a cache used to reduce data traffic to and from a memory array. In one approach, the cache merges the scrub list with cache data. Data in the scrub list can be identified and distinguished from the cache data by adding a one-bit scrub flag to each data entry in the merged cache. In this merged approach, the cache data shares the same memory as the scrub list. Read data that has an error is saved temporarily in this merged cache until the correct value for the data is written back into the memory array.

18 Claims, 11 Drawing Sheets

MEMORY DEVICE HAVING A WRITE-BACK CACHE STORING CACHE DATA AND SCRUB DATA

FIELD OF THE TECHNOLOGY

At least some embodiments disclosed herein relate to memory devices in general, and more particularly, but not limited to a memory device having a cache that stores data used for caching and scrubbing.

BACKGROUND

Memory devices are widely used to store information in various electronic devices such as computers, wireless communication devices, cameras, digital displays, and the like. Information is stored by programming different states of a memory device. For example, binary devices have two states, often denoted by a logic "1" or a logic "0". In other systems, more than two states may be stored. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory cells may maintain their stored logic state for extended periods of time even in the absence of an external power source. Volatile memory cells may lose their stored state over time unless they are periodically refreshed by an external power source.

A storage device is an example of a memory device. Typical computer storage devices have controllers that receive data access requests from host computers and perform programmed computing tasks to implement the requests in ways that may be specific to the media and structure configured in the storage devices. In one example, a memory controller manages data stored in memory and communicates with a computer device. In some examples, memory controllers are used in solid state drives for use in mobile devices or laptops, or media used in digital cameras.

Firmware can be used to operate a memory controller for a particular storage device. In one example, when a computer system or device reads data from or writes data to a memory device, it communicates with the memory controller.

Memory devices typically store data in memory cells. In some cases, memory cells exhibit non-uniform, variable electrical characteristics that may originate from various factors including statistical process variations, cycling events (e.g., read or write operations on the memory cells), or a drift (e.g., a change in resistance of a chalcogenide alloy), among others.

In one example, reading a set of data (e.g., a codeword, a page) is carried out by determining a read voltage (e.g., an estimated median of threshold voltages) of memory cells that store the set of data. In some cases, a memory device may include an array of PCM cells arranged in a 3D architecture, such as a cross-point architecture to store the set of data. PCM cells in a cross-point architecture may represent a first logic state (e.g., a logic 1, a SET state) associated with a first set of threshold voltages, or a second logic state (e.g., a logic 0, a RESET state) associated with a second set of threshold voltages. In some cases, data may be stored using encoding (e.g., error correction coding (ECC)) to recover data from errors in the data stored in the memory cells.

For resistance variable memory cells (e.g., PCM cells), one of a number of states (e.g., resistance states) can be set. For example, a single level cell (SLC) may be programmed to one of two states (e.g., logic 1 or 0), which can depend on whether the cell is programmed to a resistance above or below a particular level. As an additional example, various resistance variable memory cells can be programmed to one of multiple different states corresponding to multiple data states, e.g., 10, 01, 00, 11, 111, 101, 100, 1010, 1111, 0101, 0001, etc. Such cells may be referred to as multi state cells, multi-digit cells, and/or multi-level cells (MLCs).

The state of a resistance variable memory cell can be determined (e.g., read) by sensing current through the cell responsive to an applied interrogation voltage. The sensed current, which varies based on the resistance of the cell, can indicate the state of the cell (e.g., the binary data stored by the cell). The resistance of a programmed resistance variable memory cell can drift (e.g., shift) over time. Resistance drift can result in erroneous sensing of a resistance variable memory cell (e.g., a determination that the cell is in a state other than that to which it was programmed, among other issues).

A PCM cell, for example, may be programmed to a reset state (amorphous state) or a set state (crystalline state). A reset pulse (e.g., a pulse used to program a cell to a reset state) can include a relatively high current pulse applied to the cell for a relatively short period of time such that the phase change material of the cell melts and rapidly cools, resulting in a relatively small amount of crystallization. Conversely, a set pulse (e.g., a pulse used to program a cell to a set state) can include a relatively lower current pulse applied to the cell for a relatively longer time interval and with a slower quenching speed, which results in an increased crystallization of the phase change material.

A programming signal can be applied to a selected memory cell to program the cell to a target state. A read signal can be applied to a selected memory cell to read the cell (e.g., to determine the state of the cell). The programming signal and the read signal can be current and/or voltage pulses, for example.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
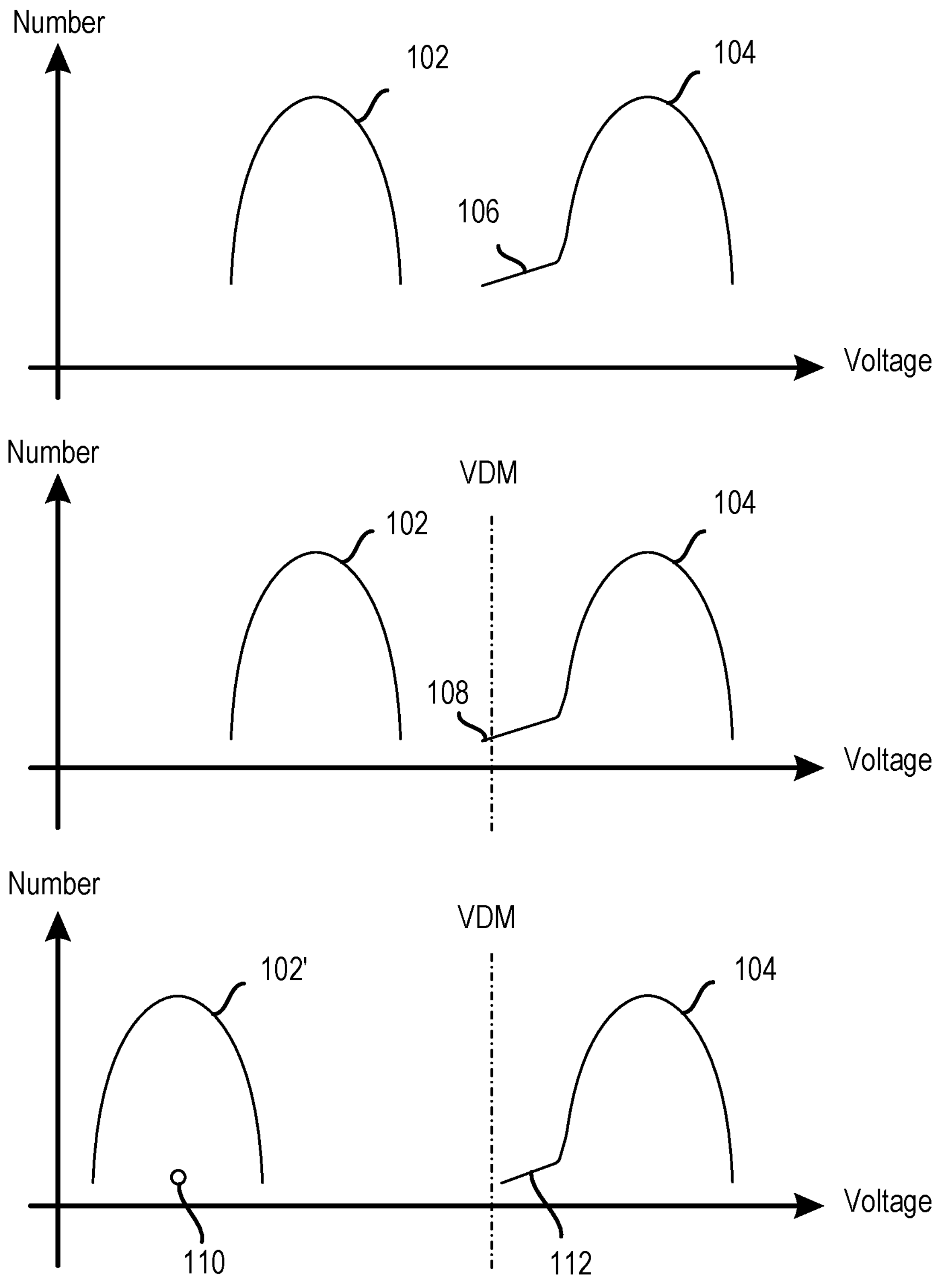
FIG. 1 shows exemplary graphs illustrating distributions for two populations of memory cells having different median threshold voltages.

The following disclosure describes various embodiments for a memory device having a cache that stores data for use in caching and scrubbing during operation of the memory device. The data used for caching is sometimes referred to herein as cache data. The data used for scrubbing (e.g., a process to clean stored data that was previously found to have an error) is sometimes referred to herein as scrub data. The cache stores both cache data and scrub data. The cache data is generally stored, for example, to reduce traffic to and from a memory array.

The cache may be used in various types of memory devices. Examples of memory devices include phase change memory devices, NAND or NOR flash memory devices, and dynamic random access memory (DRAM) devices. In one example, the memory device uses a vertically-integrated three-dimensional memory array.

The cache itself can be implemented using various types of memory. Examples include static random access memory (SRAM) or DRAM. In one example, an SRAM cache stores data to reduce data traffic to and from a memory array having chalcogenide memory cells. A controller typically can read data from the SRAM cache much faster than from the memory cells of the memory array. So, when the data is available in the cache, the controller usually reads requested data from the cache instead of from the memory cells.

At least some embodiments herein relate to a memory device that stores data for software executing on a host device. Examples of host devices include a computing device of an autonomous vehicle, or a controller that accesses data stored in various storage devices. In one example, the memory device is a solid-state drive (SSD) mounted in an electric vehicle. In one example, software executing on a controller of a vehicle is used to control navigation, steering, braking and/or other functions of the vehicle.

For some types of memory devices, the reading of memory cells in a memory array is referred to as a destructive read because the data stored in the memory cells is lost as part of the read operation. For example, the threshold voltage of the memory cell can be significantly changed as a result of the read operation, thus causing loss of the original logic state that represents the stored data. After the read operation, the data must be restored in the memory cells. Examples of memory cells that exhibit a destructive read during a read operation include DRAM cells and chalcogenide memory cells.

For example, in a chalcogenide memory cell array, the memory read mechanism is intrinsically destructive. Simply stated, once a memory cell having a higher threshold voltage (e.g., a zero logic state) switches on (e.g., snaps), its threshold voltage is reset to a lower value (e.g., a one logic state).

For a chalcogenide memory cell array, the read mechanism used should switch on only the cells that have a low threshold voltage. Typically, a read reference voltage (e.g., a demarcation voltage VDM) is applied to read the cells. If the read voltage applied is too high, one or more high threshold cells can be erroneously switched on and their data content reset to a different logic state. This is a particular problem for cells having a threshold voltage that is close to the read reference voltage, which increases the chance of an erroneous switching on of the cells, which causes a read error.

FIG. 1 shows exemplary graphs illustrating distributions for two populations of memory cells having different median threshold voltages (e.g., low and high medians) Each population corresponds to a different logic state. Population 102 has chalcogenide memory cells with lower threshold voltages (see top graph). Population 104 has chalcogenide memory cells with higher threshold voltages. A tail portion 106 of population 104 contains memory cells having threshold voltages lower than most other memory cells in population 104. Memory cells in tail portion 106 are at an increased risk of an erroneous read due to having a lower threshold voltage.

A reference voltage VDM is applied, as illustrated (in the middle graph), to read memory cells in populations 102 and 104. One or more of memory cells 108 in the tail portion 106 fall below the applied reference voltage. As a result, memory cells 108 are erroneously switched on. This causes the threshold voltages of memory cells 108 to decrease to a significantly lower threshold voltage. The memory cells 108 having this lower threshold voltage after switching on are illustrated as memory cells 110 (in the bottom graph).

The memory cells in population 102 properly switch on because they have threshold voltages below the applied reference voltage. After switching on, the threshold voltages of these memory cells decrease, and the shifted population 102 is illustrated as population 102'.

Memory cells 110 have a threshold voltage in a range that corresponds to the logic state of population 102 or 102', and thus memory cells 110 now store erroneous data. The other memory cells 112 of tail portion 106 have threshold voltages above the applied reference voltage. Thus, memory cells 112 do not switch on during the read operation and store data without an error.

As data is read from a memory array, errors in the data can be identified (e.g., using error correction codes as described below). For example, these errors can include errors that resulted from erroneous switching on of memory cells 108 above.

In many memory devices, error correction codes (ECCs) are used to identify errors in data that is read from the memory array. In one example, a memory device has a controller that cleans data identified as having an error. The data is cleaned by writing the correct information to one or more memory cells in the memory array.

As errors are identified, the correct data value could be rewritten to the erroneous memory cell(s) immediately on the fly. Memory devices also can record some or all the errors in a scrub list for later correction. The list is used to correct (e.g., clean) the errors when the memory device is, for example, idle. In one example, a scrub list is used to identify and repair, with a higher priority, pages in memory that are known to contain errors. In one example, the address and correct data value are stored in the scrub list in order to recover the correct data during an upcoming memory maintenance operation.

In one example, error correction codes can correct single bit flip errors when they are discovered. Checking for and correcting such errors (error check and scrub or ECS) is delayed until the memory is accessed. In one example, ECS can be performed by a specifically designated circuit (e.g., an ECS circuit on a DRAM die), or can be performed by other firmware or software (e.g., through instructions executed by a controller either on the memory device or external to the memory device, such as a CPU).

One technical problem with using a scrub list is that as errors accumulate over time, the size of the scrub list increases. The size of the scrub list must be designed to accommodate this increase by having a reasonable minimum capacity. If numerous errors are expected for a given memory type, the scrub list can become large. Thus, the scrub list can consume a large portion of the area of memory (e.g., memory chip area). This can reduce the storage density of a memory device, and increase the cost of the memory device for a given storage capacity.

To address these and other technical problems, a cache is used that merges scrub data (e.g., the scrub list above) and cache data (e.g., a cache list) into the same memory. Data in the scrub list can be identified and distinguished from data in the cache list, for example, by adding a flag (e.g., a one-bit scrub flag) to each data entry. For example, the scrub flag is set to indicate that data is in the scrub list, and is not set (or reset) to indicate that data is in the cache list.

This merged approach for operating the cache, for example, reduces the area required on a memory chip because it avoids replicating circuitry of the cache that is needed to use the scrub list. In this merged approach, the cache list shares the same memory as the scrub list. In one example, the cache uses the same input/output circuitry to access either of cache data or scrub data in the memory.

In one example, a scrub list and cache memory are merged by adding only a one-bit flag. The data that is known to contain an error (e.g., determined during a read) is saved temporarily in this merged cache until the correct value is written back into the memory cell(s).

In one embodiment, a memory device has a memory array with memory cells. The memory device includes a cache to store data with an indication of whether the data needs correction in the memory array. The memory device also includes a memory controller to receive read commands from a host device to read data. In response to receiving a read command, the controller determines whether the requested data is stored in the cache. In response to determining that the data is not stored in the cache, the controller reads the data from the physical memory array and determines whether the read data has an error (e.g., using an ECC engine).

In response to determining that the read data has an error, the ECC engine is used to correct the data. The controller writes the corrected data in the cache with an indication (e.g., setting a scrub flag) that the data needs correction in the memory array. The controller also sends the corrected data to the host device as a reply to the read command.

In one embodiment, a merged cache saves a list of data entries that each include a logical address and a data value. The data is saved until evicted. The cache uses a different condition for data eviction of scrub data as contrasted to cache data. The scrub data is optionally evicted once new data is used to overwrite the same address location, or corrected data is written back to the memory array for that address. In one example, the scrub data can be transformed to cache data by simply clearing the corresponding scrub flag. The cache data is evicted if too many other new data values are read and the capacity of the cache has been reached.

In one embodiment, to merge the eviction functions above, the eviction mechanism is adapted so that data needing a scrub is saved into the cache memory with a special flag (e.g., scrub flag) or saved into a special area of the cache (e.g., scrub area). This special flag or area indicates that the entry is scrub data. For example, this scrub data will not be evicted by a series of read commands when the flag is set.

Figure 2:
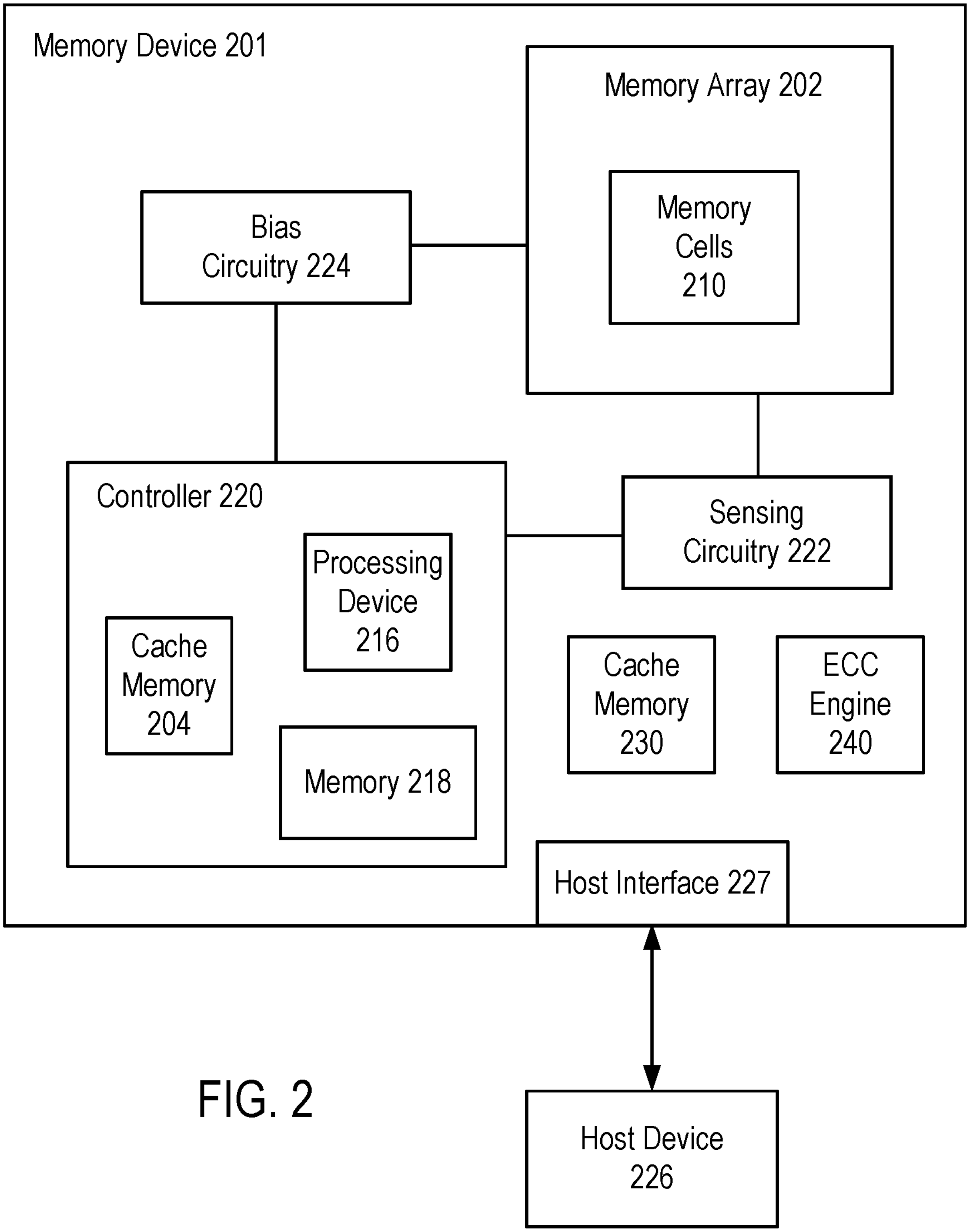
FIG. 2 shows a memory device having a cache that merges storage of both cache data and scrub data, in accordance with some embodiments.

FIG. 2 shows a memory device 201 having a cache that merges storage of both cache data and scrub data, in accordance with some embodiments. Memory device 201 stores data in one or more memory arrays 202. Each memory array 202 has memory cells 210 used to store, for example, individual bits of data. In one example, memory cells 210 are chalcogenide memory cells.

Controller 220 manages the reading and writing of data in memory array 202. Controller 220 uses bias circuitry 224 to apply various voltages to memory cells 210 when reading or writing data. Controller 220 uses sensing circuitry 222 to determine a logic state of each memory cell 210. In one example, sensing circuitry 222 senses whether a current through a memory cell 210 exceeds a threshold when a read voltage (e.g., VDM above) is applied to the memory cell 210.

In one example, memory device 201 implements the cache using cache memory 204 of controller 220. In one example, memory device 201 implements the cache using cache memory 230 outside of controller 220 (e.g., cache memory 230 is on a separate memory chip from controller 220). In one example, memory device 201 implements the cache using both cache memory 204 and 230.

Data is stored in the cache with an indication of whether the data needs correction in memory array 202. In one example, this indication is a scrub flag, such as discussed above. In one example, this indication is storage in a scrub area (e.g., see discussion below).

Host device 226 stores data in memory device 201. Memory device 201 communicates with host device 226 using host interface 227. Controller 220 receives various commands from host device 226 over host interface 227. These commands include, for example, read and write commands each associated with one or more addresses for data to be read from or written in memory array 202.

In one example, controller 220 receives a read command from host device 226 to read data at a logical address. In response to receiving the read command, controller 220 determines whether the requested data is stored in the cache. In one example, controller 220 determines whether the logical address has previously been written in the cache. If the requested data is in the cache, controller 220 reads the data from the cache at the logical address and sends the data to host device 226 in reply to the read command.

If controller 220 determines that the requested data is not stored in the cache, controller 220 reads the data stored in memory array 202 at the logical address. When reading the data from memory array 202, error correction code (ECC) engine 240 determines whether the read data has one or more errors.

If ECC engine 240 determines that the read data has an error, ECC engine 240 corrects the data using one or more error correction codes. Controller 220 writes the corrected data in the cache with an indication that the data needs future correction in memory array 202. In one example, controller 220 sets a scrub flag for the corrected data stored in the cache. Controller 220 sends the corrected data to host device 226 in reply to the read command.

Controller 220 includes one or more processing devices 216 and memory 218. In one example, memory 218 stores firmware executed by processing device 216 to select and apply read or write voltages to memory cells 210.

In one embodiment, an eviction process is used to evict data from the cache. For example, data must be evicted when the cache reaches a maximum capacity in order to write new data in the cache. For example, the entry of new data with the scrub flag set may first require eviction of older data from the cache (e.g., if no cache location is free).

For cache data (e.g., data stored in the cache without the scrub flag being set), eviction of data can be handled in a way similar to a conventional cache. For example, the oldest cache data can be evicted first (e.g., a FIFO cache).

For scrub data (e.g., corrected data stored in cache with the scrub flag set), eviction of data is done only when the corrected data is written back in memory array 202. For example, controller 220 does not evict scrub data until determining that the corrected data has been stored in memory array 202.

In one embodiment, controller 220 periodically performs maintenance operations for memory array 202. These operations can include a scrubbing process that determines addresses in the cache which have a scrub flag set. In response to determining that an address has a flag set, the corresponding corrected data in the cache for that address is written to memory array 202. After writing the corrected data in memory array 202, the scrub flag is cleared. As indicated above, another way to clear the scrub flag can be used. If new data is written to a logical address, then the scrub flag for that logical address is cleared.

In one embodiment, when performing a read operation, bias circuitry 224 applies voltages to memory cells 210. In one example, bias circuitry 224 includes wordline and bitline drivers (not shown) to bias wordlines and bitlines of memory array 202. Controller 220 receives signaling regarding which memory cells 210 switch (e.g., threshold or snap). In one example, the signaling is received from sensing circuitry 222.

In one embodiment, sensing circuitry 222 includes sense amplifiers for sensing a characteristic associated with memory cells 210. The characteristic can be, for example, a voltage and/or current associated with a selected memory cell.

In one example, if sensing circuitry 222 determines that the current for a memory cell is greater than a fixed threshold (e.g., a predetermined level of current), then controller 220 determines that the memory cell has switched (e.g., snapped).

In one embodiment, memory controller 220 receives a write command from host device 226. The write command is accompanied by data (e.g., user data of host device 226) to be written to memory array 202. In response to receiving the write command, controller 220 initiates a programming operation.

In one embodiment, controller 220 uses write voltages (e.g., write pulses) to write a logic state to a memory cell 210 during a write or programming operation. The write pulses may be applied by providing a first voltage to a bitline and providing a second voltage to a wordline to select the memory cell. Circuits coupled to access lines to which memory cells may be coupled may be used to provide the write voltages (e.g., access line drivers included in decoder circuits). The circuits may be controlled by internal control signals provided by a control logic (e.g., controller 220). The resulting voltage applied to the memory cell is the difference between the first and second voltages. The write pulses may be the same duration as read pulses in some embodiments. In some embodiments the duration is 10-50 ns. In some embodiments, the duration is 1-100 ns. In some embodiments, the duration is 1 ns to 1 microsecond.

In one example, the polarity of the read or write pulses may be either a first polarity or a second polarity. For example, a write pulse may apply a voltage to a memory cell in a first polarity (e.g., bitline at 6 V and wordline at 0 V).

In one example, circuits coupled to access lines to which memory cells may be coupled are used to provide read pulses (e.g., access line drivers included in decoder circuits). The circuits may be controlled by internal control signals provided by a control logic (e.g., controller 220). A read voltage or pulse may be a voltage applied to a memory cell fora period of time (e.g., 10-50 ns, 1-100 ns, 1 ns to 1 microsecond). In some embodiments, the read pulse may be a square pulse. In some embodiments, the read pulse may be a ramp, that is, a linearly increasing voltage may be applied across the memory cell.

In one example, after being accessed (e.g., selected), a memory cell 210 may be read, or sensed, by a sense component (e.g., sensing circuitry 222) to determine the stored state of the memory cell. For example, a voltage may be applied to the memory cell (using a wordline and bitline) and the presence of a resulting current may depend on the applied voltage and the threshold voltage of the memory cell. In some cases, more than one voltage may be applied. Additionally, if an applied voltage does not result in current flow, other voltages may be applied until a current is detected by the sense component.

By assessing the voltage that resulted in current flow, the stored logic state of the memory cell may be determined. In some cases, the voltage may be ramped up in magnitude until a current flow is detected (e.g., a memory cell turns on, switches on, conducts current, or becomes activated). In other cases, predetermined voltages may be applied sequentially until a current is detected. Likewise, a current may be applied to a memory cell, and the magnitude of the voltage to create the current may depend on the electrical resistance or the threshold voltage of the memory cell.

In some cases, the memory cell (e.g., a PCM cell) includes a material that changes its crystallographic configuration (e.g., between a crystalline phase and an amorphous phase), which in turn, determines a threshold voltage of the memory cell to store information. In other cases, the memory cell includes a material that remains in a crystallographic configuration (e.g., an amorphous phase) that may exhibit variable threshold voltages to store information.

The sense component may include various transistors or amplifiers in order to detect and amplify a difference in the signals. The detected logic state of the memory cell may then be output through a column decoder as output. In some cases, the sense component may be part of a column decoder or a row decoder.

At least some embodiments herein relate to memory devices that use bipolar operations for a memory array. In one example, bipolar select voltages are used to select memory cells of the memory array. In one example, the memory cells are arranged in a cross-point architecture. In one example, each memory cell is formed using a single select device. In one example, the select device includes a chalcogenide material that switches (e.g., snaps) when a sufficient voltage is applied across the memory cell.

In some cases, a memory device may include an array of memory cells arranged in a three-dimensional (3D) architecture, such as a cross-point architecture, to store the set of data. The memory cells in a cross-point architecture may, for example, represent a first logic state (e.g., a logic 1, a SET state) associated with a first set of threshold voltages, or a second logic state (e.g., a logic 0, a RESET state) associated with a second set of threshold voltages.

In other embodiments, the memory cells may be arranged in a three-dimensional (3D) vertical architecture. A 3D vertical architecture may include memory cells located at the crossing between a vertical access line (e.g., a bitline pillar), and each one of a plurality of second access lines (e.g., wordlines), formed in horizontal planes or decks parallel to each other.

More generally, an integrated circuit memory cell, such as a memory cell in a cross-point memory or a 3D vertical array, can be programmed to store data by the way of its state at a voltage applied across the memory cell. For example, if a memory cell is configured or programmed in such a state that allows a substantial current to pass the memory cell at a voltage in a predefined voltage region, the memory cell is considered to have been configured or programmed to store a first bit value (e.g., one or zero); and otherwise, the memory cell is storing a second bit value (e.g., zero or one).

Optionally, a memory cell can be configured or programmed to store more than one bit of data by being configured or programmed, for example, to have a threshold voltage in one of more than two separate voltage regions.

The threshold voltage of a memory cell is such that when the voltage applied across the memory cell is increased to above the threshold voltage, the memory cell switches by changing rapidly or abruptly, snapping (e.g., for a chalcogenide memory cell), or jumping from a non-conductive state to a conductive state. The non-conductive state allows a small leak current to go through the memory cell; and in contrast, the conductive state allows more than a threshold amount of current to go through. Thus, a memory device can use a sensor (e.g., sense amplifier) to detect the change, or determine the conductive/non-conductive state of the memory device at one or more applied voltages, to evaluate or classify the level of the threshold voltage of the memory cell and thus its stored data.

The threshold voltage of a memory cell being configured/programmed to be in different voltage regions can be used to represent different data values stored in the memory cell. For example, the threshold voltage of the memory cell can be programmed to be in any of four predefined voltage regions; and each of the regions can be used to represent the bit values of a different two-bit data item. Thus, when given a two-bit data item, one of the four voltage regions can be selected based on a mapping between two-bit data items and voltage regions; and the threshold voltage of the memory cell can be adjusted, programmed, or configured to be in the selected voltage region to represent or store the given two-bit data item. To retrieve, determine, or read the data item from the memory cell, one or more read voltages can be applied across the memory cell to determine which of the four voltage regions contain the threshold voltage of the memory cell. The identification of the voltage region that contains the threshold voltage of the memory cell provides the two-bit data item that has been stored, programmed, or written into the memory cell.

For example, a memory cell can be configured or programmed to store a one-bit data item in a Single Level Cell (SLC) mode, or a two-bit data item in a Multi-Level Cell (MLC) mode, or a three-bit data item in a Triple Level Cell (TLC) mode, or a four-bit data item in Quad-Level Cell (QLC) mode.

Figure 3:
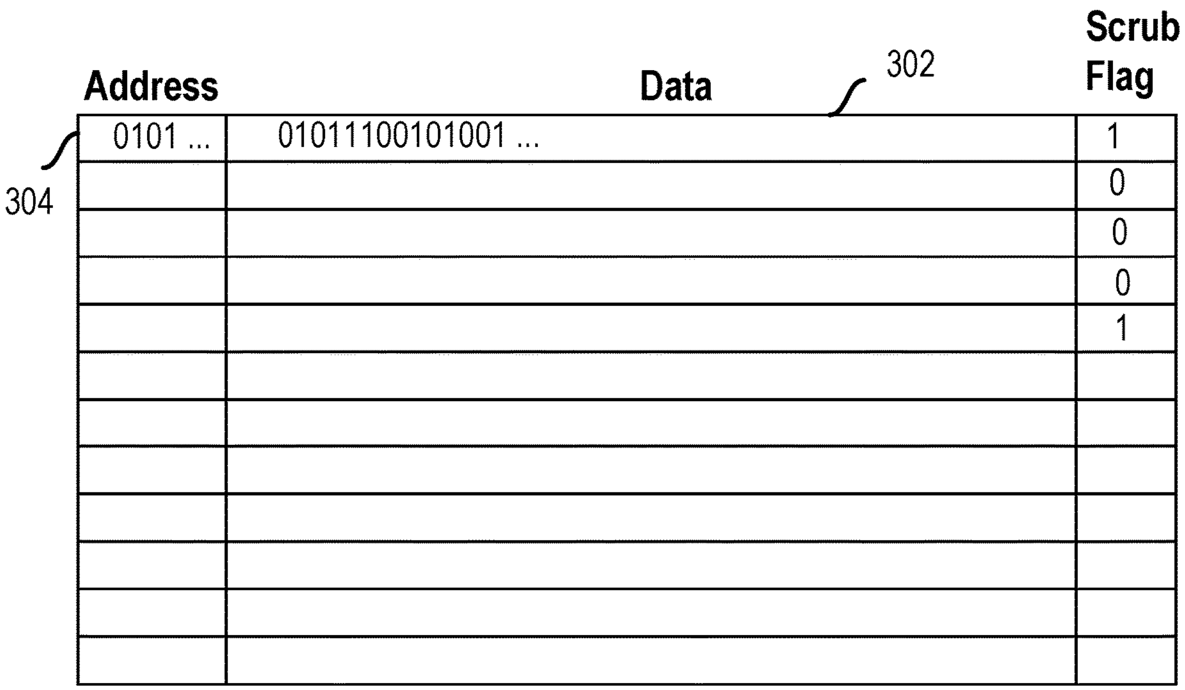
FIG. 3 shows an exemplary data structure for a cache that stores data with a scrub flag to indicate that scrubbing to correct one or more errors is needed, in accordance with some embodiments.

FIG. 3 shows an exemplary data structure for a cache 302 that stores data with a scrub flag to indicate that scrubbing to correct one or more errors is needed, in accordance with some embodiments. In one example, cache 302 is implemented using cache memory 204 and/or cache memory 230.

Cache 302 includes various entries 304. Each entry includes a logical address and a data value. Each entry further includes a scrub flag that is set (e.g., set to 1) to indicate that the entry is scrub data. In one example, if errors were detected in the data for an entry and a scrub is required at the corresponding address for the data, then controller 220 sets the scrub flag as each entry 304 is added to cache 302. In some embodiments, each entry in cache 302 includes only an address and a scrub flag.

Some of the entries in cache 302 have a scrub flag that is not set (e.g., set to 0). These entries are used as cache data.

In one embodiment, during a read command, in the case of an address hit in cache 302 on scrub data, the scrub data is read from cache 302 and not from memory array 202.

In one embodiment, during a read command, in the case of address hit in cache 302 on scrub data, the read delay associated with the read command can be used to write back the correct value (the corrected data) in memory array 202. At this time, the scrub flag of the data is reset. The corresponding location in cache 302 can be evicted, or the location can be inserted or remain in cache 302 with the scrub flag being clear.

Figure 4:
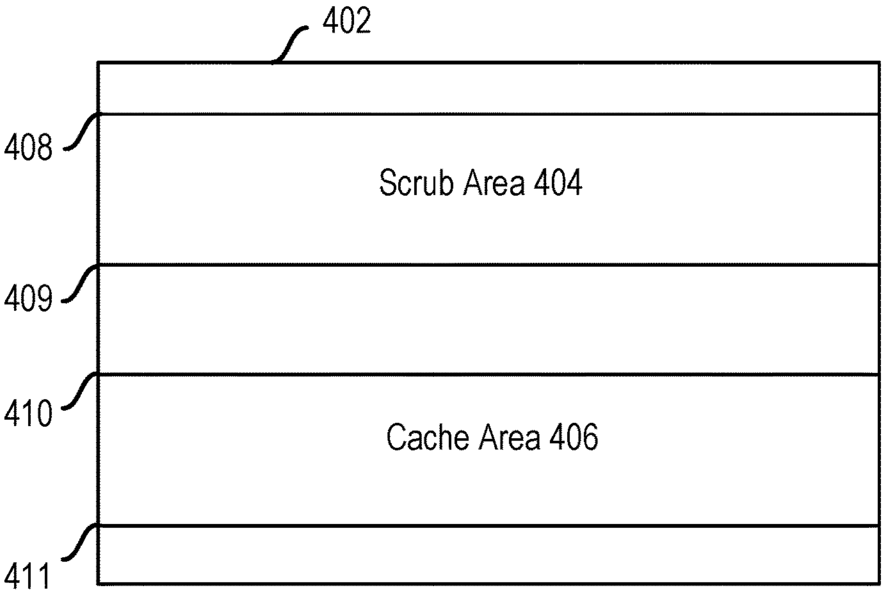
FIG. 4 shows a cache having a scrub area and a cache area defined by pointers, in accordance with some embodiments.

FIG. 4 shows a cache 402 having a scrub area 404 and a cache area 406 defined by pointers, in accordance with some embodiments. In one example, cache 402 is implemented using cache memory 204 and/or cache memory 230.

In one example, each entry in scrub area 404 or cache area 406 includes an address and corresponding data, such as described for FIG. 3 above. In some embodiments, each entry may include only an address. In this case, cache 402 can be used as a scrub list, but cannot be used to store cache data. This scrub list is typically less effective than a scrub list also containing the data as new errors could appear and overcome the ECC correction capability in the meantime.

In one embodiment, cache 402 can be implemented without using a scrub flag for each entry. Instead, the presence of data in the scrub area 404 provides the indication that the data needs correction in the memory array. After scrub data in scrub area 404 is corrected in the memory array, the corrected data can optionally be moved from scrub area 404 to cache area 406. Alternatively, the corrected data can simply be removed from scrub area 404.

In one embodiment, values for pointers 408, 409 define scrub area 404 and are maintained by controller 220 including updating during operation as needed. Values for pointers 410, 411 define cache area 406 and are also maintained by controller 220. Controller 220 updates the values for these pointers as data is added to or removed from scrub area 404 and/or cache area 406.

In one embodiment, cache 402 is working as a FIFO cache memory. Once new scrub data is entered in scrub area 404 and the cache memory is full, one location must be removed from the FIFO part. As a consequence, one data may be evicted from the cache area 406. This creates a cache FIFO with a variable maximum length.

In one example, the newly entered value in the scrub area 404 is evicting the oldest data from the cache area 406. If a data entry is evicted from the scrub area 404, a new location is allocated to the cache area 406. There are two possible behaviors here. First, the scrub data could be moved from the scrub area 404 to the cache area 406. The scrub area length is reduced by 1, and the cache area length is increased by 1. Second, the scrub data could be removed and a location could be freed (not assigned to the cache area until a new data is to be inserted in the cache area). In this case the scrub length is reduced by 1, but the cache length does not change (until a new data is inserted in the cache area).

Figure 5:
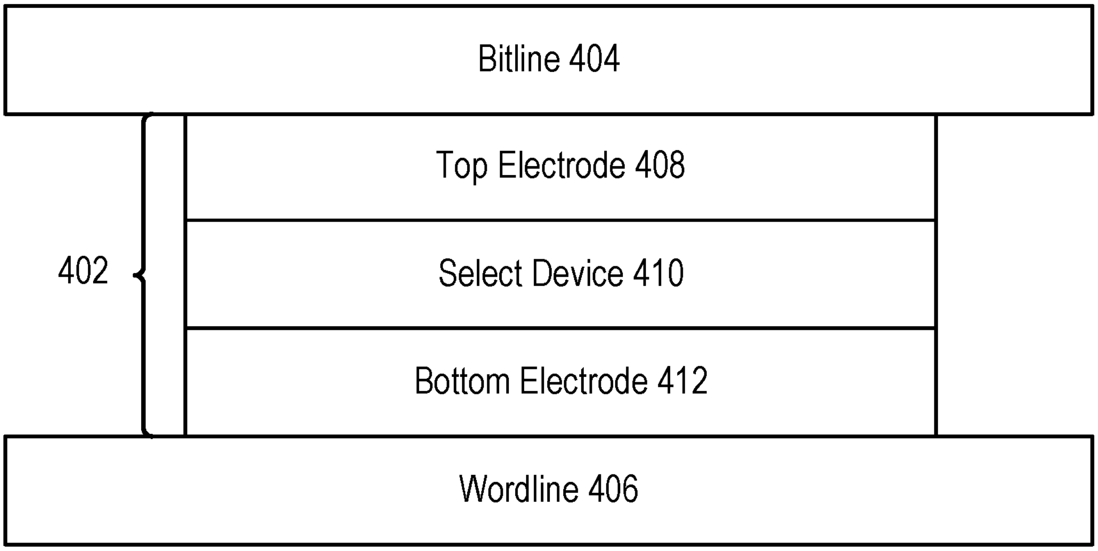
FIG. 5 shows an example of a memory cell that includes a select device, in accordance with some embodiments.

FIG. 5 shows an example of a memory cell 402 that includes a select device, in accordance with some embodiments. In one example, select device 410 includes a chalcogenide. Memory cell 402 is an example of memory cells 210.

Top electrode 408 conductively connects select device 410 to bitline 404, and bottom electrode 412 conductively connects select device 410 to wordline 406. In one example, electrodes 408, 412 are formed of a carbon material.

In one example, select device 410 includes a chalcogenide (e.g., chalcogenide material and/or chalcogenide alloy). Threshold voltage properties of the select device may be based on the voltage polarities applied to the memory cell.

In one example, a logic state may be written to memory cell 402, which may correspond to one or more bits of data. A logic state may be read from or written to the memory cell by applying voltages of different polarities at different voltage and/or current magnitudes. The reading and writing protocols may take advantage of different threshold voltages of the select device that result from the different polarities. In other words, when the memory cell is a self-selecting memory cell implemented using a selector/memory device, the select device 410 may be used as both a selecting element and a storage element of the cell 402.

Figure 6:
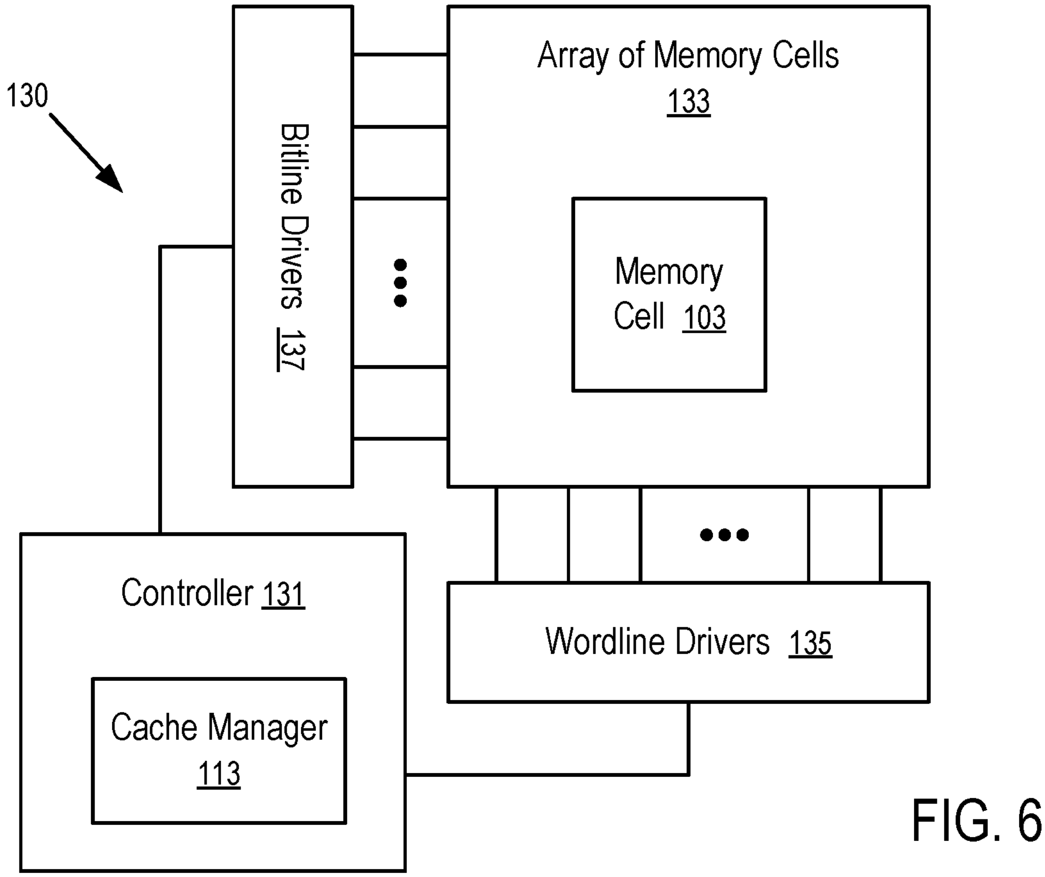
FIG. 6 shows a memory device configured with a cache manager to manage cache data and scrub data, according to one embodiment.

FIG. 6 shows a memory device 130 configured with a cache manager 113 to manage cache data and scrub data, according to one embodiment. In one example, cache manager 113 manages cache data and scrub data stored in cache 302 or 402. The cache manager 113 can be implemented, for example, via logic circuits and/or microcode/instructions.

Memory device 130 is an example of memory device 201. In FIG. 6, the memory device 130 includes an array 133 of memory cells, such as a memory cell 103. Memory cell 103 is an example of memory cell 210.

In one example, an array 133 can be referred to as a tile; and a memory device (e.g., 130) can have one or more tiles. Different tiles can be operated in parallel in a memory device (e.g., 130).

For example, the memory device 130 illustrated in FIG. 6 can have a cross-point memory having at least the array 133 of memory cells (e.g., 103). In another example, the memory device 130 illustrated in FIG. 6 can have a 3D vertical architecture having at least the array 133 of memory cells (e.g., 103).

In some implementations, the cross-point memory uses a memory cell 103 that has an element (e.g., a sole element) acting both as a selector device and a memory device. For example, the memory cell 103 can use a single piece of alloy with variable threshold capability. The read/write operations of such a memory cell 103 can be based on thresholding the memory cell 103 while inhibiting other cells in sub-threshold bias, in a way similar to the read/write operations for a memory cell having a first element acting as a selector device and a second element acting as a phase-change memory device that are stacked together as a column. A selector device usable to store information can be referred to as a selector/memory device.

The memory device 130 of FIG. 6 includes a controller 131 that operates bitline drivers 137 and wordline drivers 135 to access the individual memory cells (e.g., 103) in the array 133.

Figure 7:
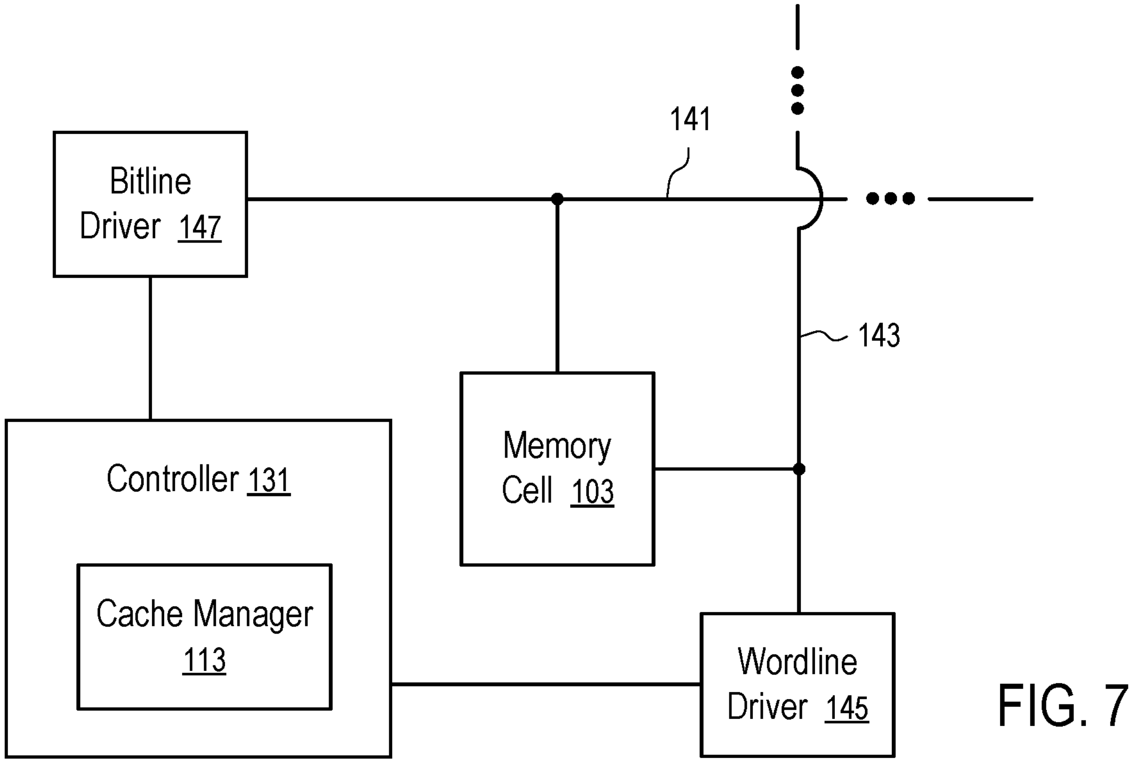
FIG. 7 shows a memory cell with a bitline driver and a wordline driver configured to apply voltages, according to one embodiment.

For example, each memory cell (e.g., 103) in the array 133 can be accessed via voltages driven by a pair of a bitline driver 147 and a wordline driver 145, as illustrated in FIG. 7 below.

FIG. 7 shows a memory cell 103 with a bitline driver 147 and a wordline driver 145 configured to apply voltages according to one embodiment. For example, the memory cell 103 can be a typical memory cell 103 in the memory cell array 133 of FIG. 6.

The bitline driver 147 and the wordline driver 145 of FIG. 7 are controlled by controller 131 to selectively apply one or more voltages to the memory cell 103. The bitline driver 147 and the wordline driver 145 can apply voltages of different polarities on the memory cell 103.

For example, in applying one polarity of voltage (e.g., positive polarity), the bitline driver 147 drives a positive voltage relative to the ground on a bitline 141 connected to a row of memory cells in the array 133; and the wordline driver 145 drives a negative voltage relative to the ground on a wordline 143 connected to a column of memory cells in the array 133.

In applying the opposite polarity of voltage (e.g., negative polarity), the bitline driver 147 drives a negative voltage on the bitline 141; and the wordline driver 145 drives a positive voltage on the wordline 143.

The memory cell 103 is in both the row connected to the bitline 141 and the column connected to the wordline 143. Thus, the memory cell 103 is subjected to the voltage difference between the voltage driven by the bitline driver 147 on the bitline 141 and the voltage driven by the wordline driver 145 on the wordline 143.

In general, when the voltage driven by the bitline driver 147 is higher than the voltage driven by the wordline driver 145, the memory cell 103 is subjected to a voltage in one polarity (e.g., positive polarity); and when the voltage driven by the bitline driver 147 is lower than the voltage driven by the wordline driver 145, the memory cell 103 is subjected to a voltage in the opposite polarity (e.g., negative polarity).

In some implementations, the memory cell 103 is a self-selecting memory cell implemented using a selector/memory device. The selector/memory device has a chalcogenide (e.g., chalcogenide material and/or chalcogenide alloy). For example, the chalcogenide material can include a chalcogenide glass such as, for example, an alloy of selenium (Se), tellurium (Te), arsenic (As), antimony (Sb), carbon (C), germanium (Ge), and silicon (Si). A chalcogenide material can primarily have selenium (Se), arsenic (As), and germanium (Ge) and be referred to as SAG-alloy. SAG-alloy can include silicon (Si) and be referred to as SiSAG-alloy. In some embodiments, the chalcogenide glass can include additional elements such as hydrogen (H), oxygen (O), nitrogen (N), chlorine (Cl), or fluorine (F), each in atomic or molecular forms.

The selector/memory device has a top side and a bottom side. In one example, a top electrode is formed on the top side of the selector/memory device for connecting to a bitline 141; and a bottom electrode is formed on the bottom side of the selector/memory device for connecting to a wordline 143. For example, the top and bottom electrodes can be formed of a carbon material. For example, a chalcogenide material of the memory cell 103 can take the form of a crystalline atomic configuration or an amorphous atomic configuration. The threshold voltage of the memory cell 103 can be dependent on the ratio of the material in the crystalline configuration and the material of the amorphous configuration in the memory cell 103. The ratio can change under various conditions (e.g., having currents of different magnitudes and directions going through the memory cell 103).

A self-selecting memory cell 103, having a selector/memory device, can be programmed to have a threshold voltage window. The threshold voltage window can be created by applying programming pulses with opposite polarity to the selector/memory device. For example, the memory cell 103 can be biased to have a positive voltage difference between two sides of the selector/memory device and alternatively, or to have a negative voltage difference between the same two sides of the selector/memory device. Reading can be performed with a given/fixed polarity. When programmed, the memory cell has a low threshold (e.g., lower than the cell that has been reset, or a cell that has been programmed to have a high threshold), such that during a read operation, the read voltage can cause a programmed cell to snap and thus become conductive while a reset cell remains non-conductive.

For example, to program the voltage threshold of the memory cell 103, the bitline driver 147 and the wordline driver 145 can drive a pulse of voltage onto the memory cell 103 in one polarity (e.g., positive polarity) to snap the memory cell 103 such that the memory cell 103 is in a conductive state. While the memory cell 103 is conductive, the bitline driver 147 and the wordline driver 145 continue driving the programming pulse to change the threshold voltage of the memory cell 103 towards a voltage region that represents the data or bit value(s) to be stored in the memory cell 103.

In one embodiment, the controller 131 can be configured in an integrated circuit having a plurality of decks of memory cells. Each deck can be sandwiched between a layer of bitlines, a layer of wordlines; and the memory cells in the deck can be arranged in an array 133. A deck can have one or more arrays or tiles. Adjacent decks of memory cells may share a layer of bitlines (e.g., 141) or a layer of wordlines (e.g., 143). Bitlines are arranged to run in parallel in their layer in one direction; and the wordlines are arranged to run in parallel in their layer in another direction orthogonal to the direction of the bitlines. Each of the bitlines is connected to a row of memory cells in the array; and each of the wordlines is connected to a column of memory cells in the array. Bitline drivers 137 are connected to bitlines in the decks; and wordline drivers 135 are connected to wordlines in the decks. Thus, a typical memory cell 103 is connected to a bitline driver 147 and a wordline driver 145.

In one embodiment, the threshold voltage of a typical memory cell 103 is configured to be sufficiently high such that when only one of its bitline driver 147 and wordline driver 145 drives a voltage in either polarity while the other voltage driver holds the respective line to the ground, the magnitude of the voltage applied across the memory cell 103 is insufficient to cause the memory cell 103 to become conductive. Thus, addressing the memory cell 103 can be performed via both of its bitline driver 147 and wordline driver 145 driving a voltage in opposite polarity relative to the ground for operating/selecting the memory cell 103. Other memory cells connected to the same wordline driver 145 can be de-selected by their respective bitline drivers holding the respective bitlines to the ground; and other memory cells connected to the same bitline driver can be de-selected by their respective wordline drives holding the respective wordlines to the ground.

A group of memory cells (e.g., 103) connected to a common wordline driver 145 can be selected for parallel operation by their respective bitline drivers (e.g., 147) driving up the magnitude of voltages in one polarity while the wordline driver 145 is also driving up the magnitude of a voltage in the opposite polarity. Similarly, a group of memory cells connected to a common bitline driver 147 can be selected for parallel operation by their respective wordline drivers (e.g., 145) driving voltages in one polarity while the bitline driver 147 is also driving a voltage in the opposite polarity.

At least some examples are disclosed herein in reference to a cross-point memory having self-selecting memory cells. Other types of memory cells and/or memory can also be used. For example, memory cells each having a selector device and a phase-change memory device and/or flash memory cells can also be used in at least some embodiments. Additionally or alternatively, the memory can have a different architecture, such as a 3D vertical architecture.

Figure 8:
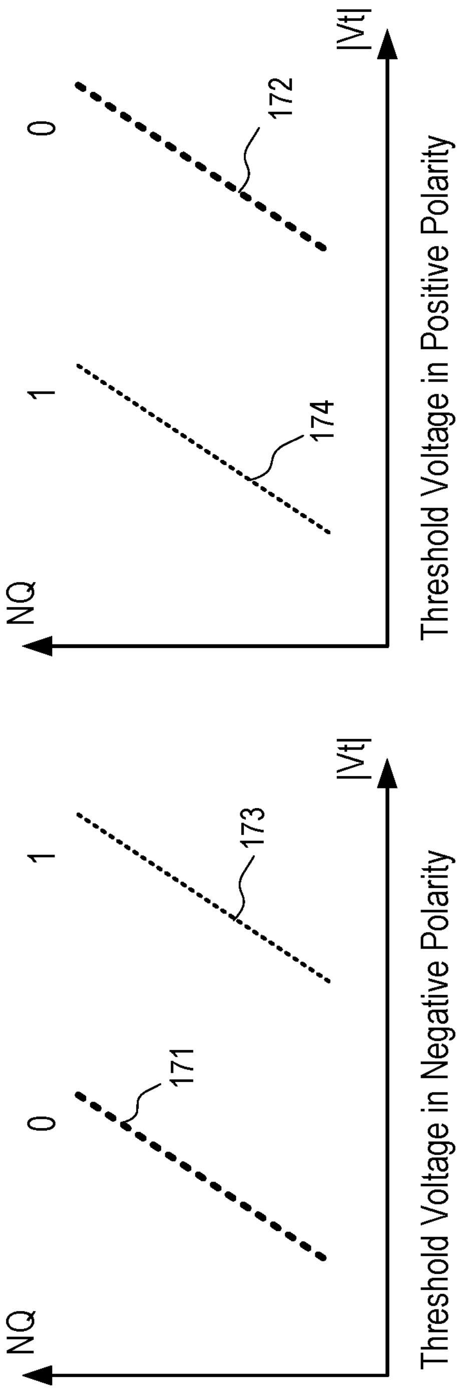
FIG. 8 shows an exemplary normal quantile (NQ) plot representing the statistical distributions of threshold voltages of memory cells.

FIG. 8 shows an exemplary normal quantile (NQ) plot representing the statistical distributions (e.g., 171-174) of threshold voltages of memory cells. In one example, the memory cells are memory cells 210. When a probability distribution (e.g., 171) of threshold voltages programmed in a region is a normal distribution (also known as Gaussian distribution), its normal quantile (NQ) plot is seen as aligned on a straight line (e.g., distribution 171).

A self-selecting memory cell (e.g., 103) can have a threshold voltage in negative polarity and a threshold voltage in positive polarity. When a voltage applied on the memory cell 103 in either polarity is increased in magnitude up to its threshold voltage in the corresponding polarity, the memory cell (e.g., 103) switches (e.g., snaps) from a non-conductive state to a conductive state.

The threshold voltage of a memory cell 103 in negative polarity and the threshold voltage of the memory cell 103 in positive polarity can have different magnitudes. Memory cells programmed to have large magnitudes in threshold voltages in positive polarity can have small magnitudes in threshold voltages in negative polarity; and memory cells programmed to have small magnitudes in threshold voltages in positive polarity can have large magnitudes in threshold voltages in negative polarity.

For example, a memory cell can be programmed to have a small magnitude in threshold voltage according to distribution 174 in the positive polarity to represent a value (e.g., one); and as a result, its threshold voltage has a large magnitude according to distribution 173 in the negative polarity to represent the same value (e.g., one). Alternatively, the memory cell can be programmed to have a large magnitude in threshold voltage according to distribution 172 in the positive polarity to represent another value (e.g., zero); and as a result, its threshold voltage has a smaller magnitude according to distribution 171 in the negative polarity to represent the same value (e.g., zero).

Thus, to determine whether a memory cell 103 is storing the one value (e.g., one) or the other value (e.g., zero), the memory cell 103 can be read in either the positive polarity or the negative polarity. If the threshold voltage of the memory cell 103 has a large magnitude according to distribution 172 in the positive polarity, it stores the other value (e.g., zero); otherwise, it stores the one value (e.g., one). Similarly, if the threshold voltage of the memory cell 103 has a large magnitude according to distribution 173 in the negative polarity, it stores the one value (e.g., one); otherwise, it stores the other value (e.g., zero).

The threshold voltage distributions of memory cells may change after a read. For example, in the positive polarity, a read can cause the high magnitude distribution 172 to shift downward, and/or the low magnitude distribution 174 to shift downward.

Similarly, in negative polarity, the read can cause the high magnitude distribution 173 to shift downward, and the low magnitude distribution 171 to shift downward.

Figure 9:
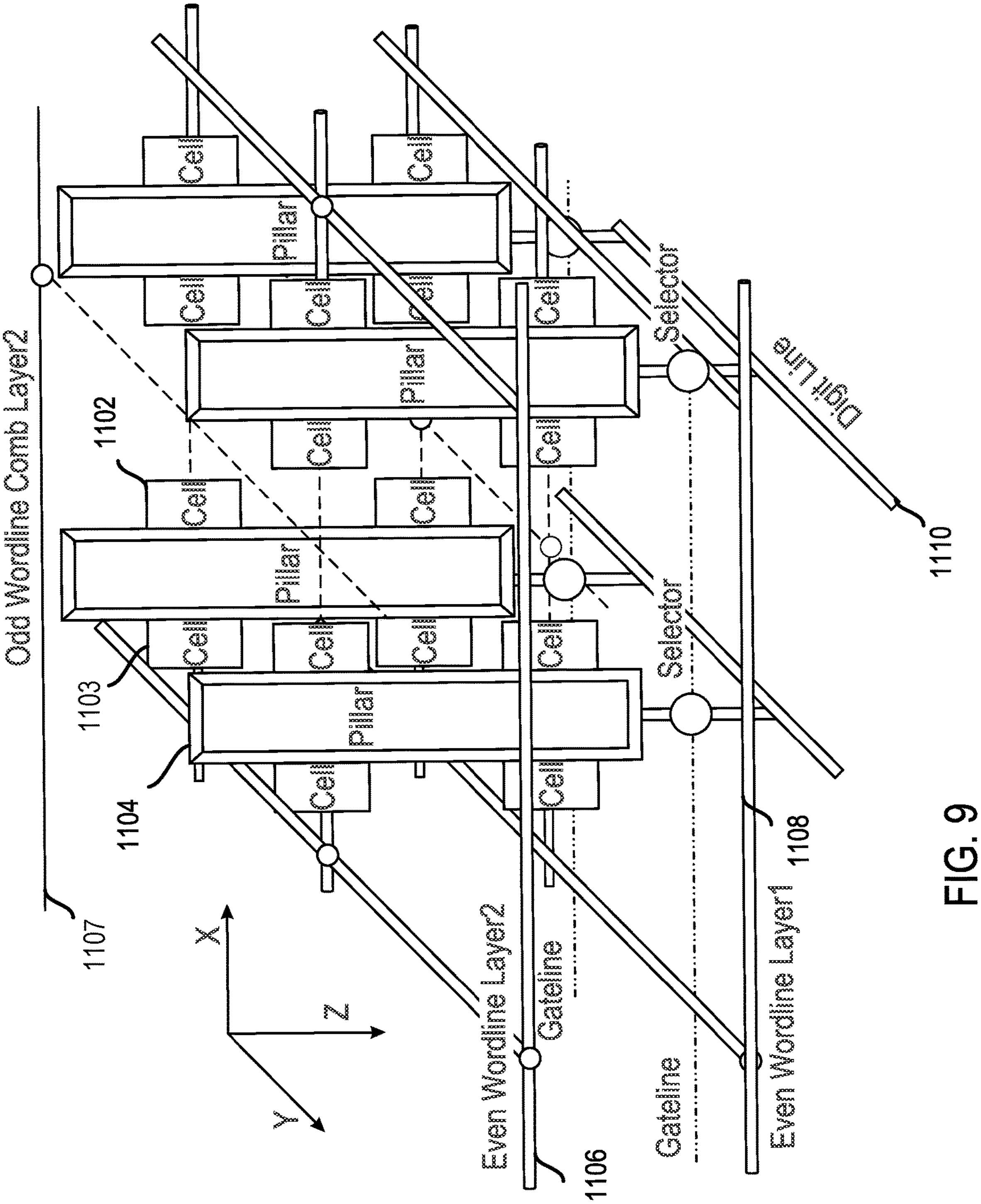
FIG. 9 shows an exemplary three-dimensional memory array structure having wordlines configured in a comb structure, in accordance with some embodiments.

FIG. 9 shows an exemplary three-dimensional memory array structure having wordlines configured in a comb structure, in accordance with some embodiments. The memory array and memory cells described herein are not limited to use in a planar architecture (e.g., with cells at crossing of wordlines (WLs) and bitlines (BLs) on different levels). Instead, the approach also can be used for vertical architectures (e.g., vertical BL pillars crossing horizontal WL planes).

An example of a vertical architecture that can be used with embodiments described in this disclosure is illustrated in FIG. 9. As illustrated, a memory array includes memory cells 1102, 1103. Each memory cell 1102, 1103 can be selected using a wordline (e.g., 1106, 1107, or 1108) and a digit line or bitline (e.g., 1110). Memory cells 1102, 1103 are an example of memory cells 210 of FIG. 1.

In one embodiment, each wordline extends in one of a plurality of horizontal planes of wordlines 1106, 1107, 1108 stacked vertically above a semiconductor substrate (not shown). Each digit line or bitline (e.g., 1110) includes a pillar 1104. Each pillar 1104 extends vertically away from the semiconductor substrate. Each memory cell 1102, 1103 is located on sides of one of pillars 1104.

In one embodiment, the memory array has a vertical array architecture comprising vertical bitlines (e.g., vertical pillars 1104) or digit lines intersecting a plurality of horizontal decks of wordlines (e.g., even wordlines 1106 and odd wordlines 1107). Each deck is configured as two interdigitated wordline combs so that each bitline or digit line forms two cells 1102, 1103 at each of the decks. In one example, even wordlines 1106 are interdigitated with odd wordlines 1107 in a comb structure as illustrated.

Figure 10:
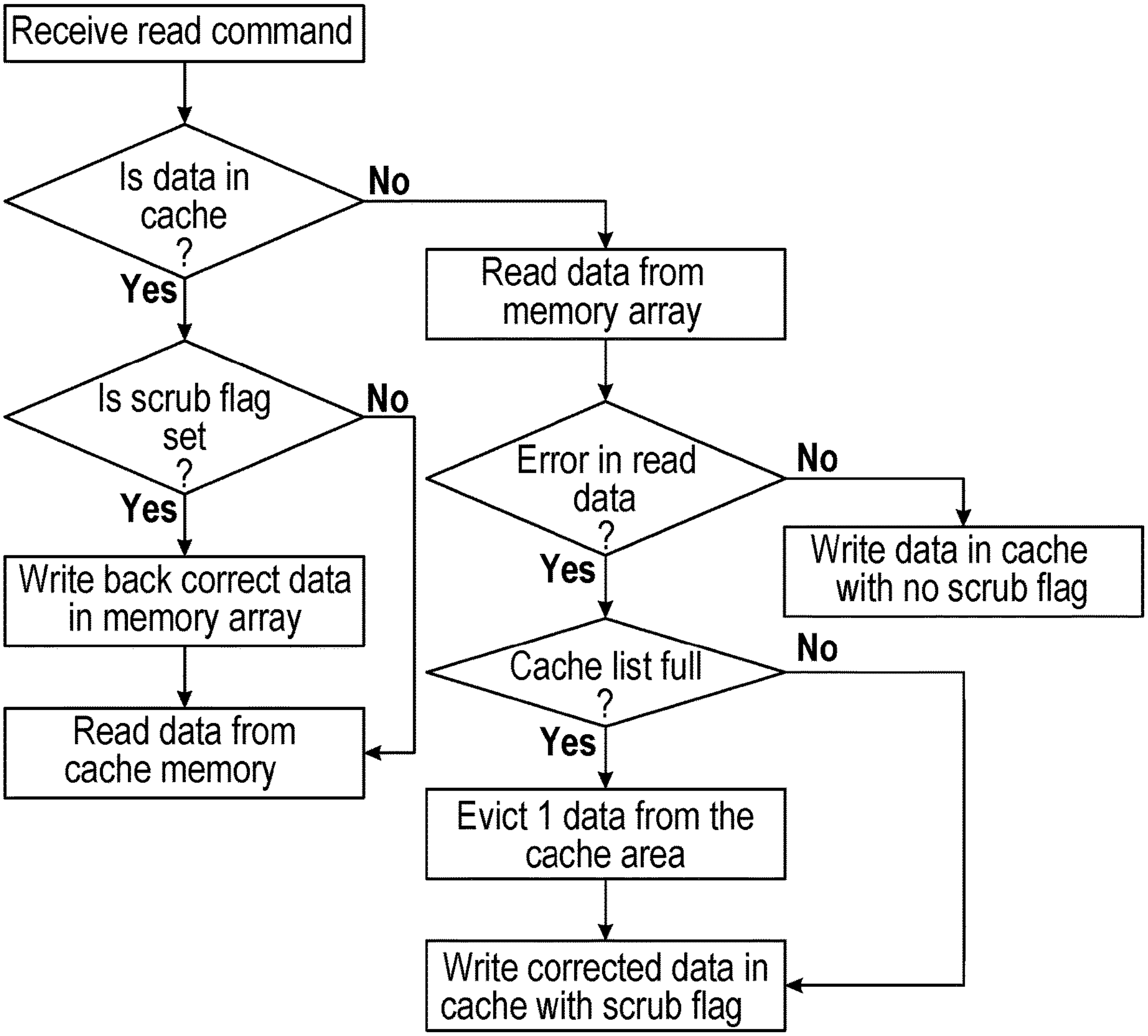
FIG. 10 shows a process for managing a cache when read commands are received, in accordance with some embodiments.

FIG. 10 shows a process for managing a cache when read commands are received, in accordance with some embodiments. In one example, the process is implemented by cache manager 113. In one example, the process is implemented by controller 220 to manage scrub data and cache data stored in cache memory 204, 230.

As read commands are received by a controller of a memory device from a host device, the controller determines whether data requested by the read command is available in a cache. In one example, the read commands are received from host device 226. In one example, the read command requests data at a logical address, and the controller determines whether the address is stored in the cache.

If the controller determines that the data is not available in the cache, then the controller reads the data from a memory array (e.g., memory array 202). If the controller determines that the data is available in the cache, then the controller determines if the scrub flag is set in the cache for the data.

If the scrub flag is not set, the data is read from the cache. If the scrub flag is set, the corrected data stored in the cache is optionally written back in the memory array. The data read from the cache is sent to the host device in reply to the read command.

As mentioned above, the data is read from the memory array if the data is not in the cache. The controller determines whether the data read from the memory array has an error. In one example, ECC engine 240 determines whether the read data has an error.

If the read data does not have an error, then the data read from the memory array is written in the cache. The scrub flag is not set. The read data is sent to the host device that requested the data.

If the read data does have an error, the data is corrected. In one example, this correction is performed by ECC engine 240. The corrected data is sent to the host device.

For the data that is corrected, the controller determines whether the cache is full. If not, the corrected data is written in the cache with the scrub flag set. If the cache is full, then at least one data entry is evicted from the cache to make room for writing the corrected data in the cache.

Figure 11:
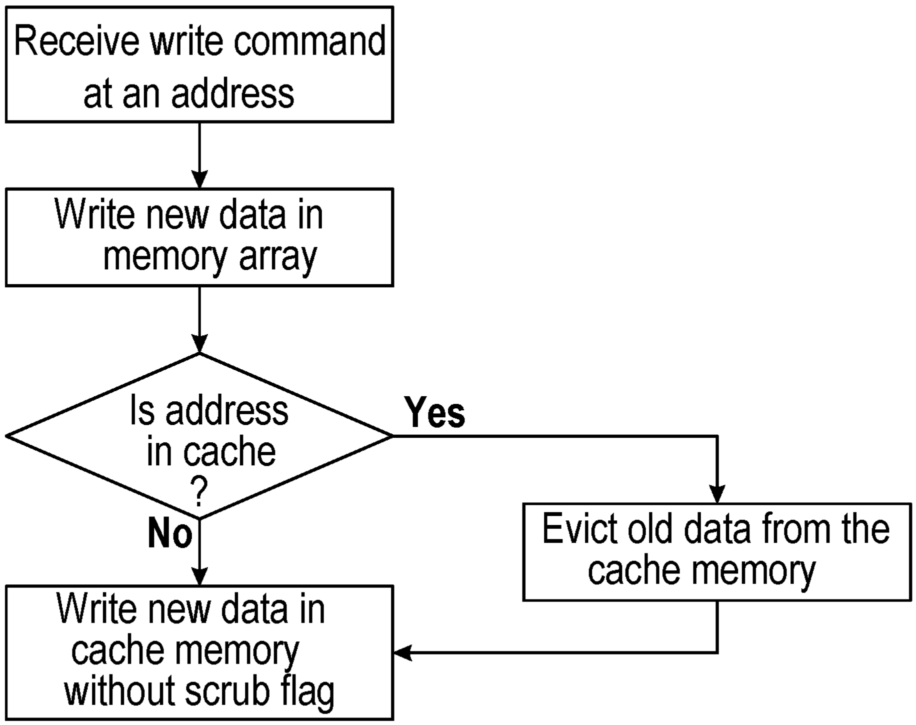
FIG. 11 shows a process for managing a cache when write commands are received including determining whether an address is saved in a cache, in accordance with some embodiments.

FIG. 11 shows a process for managing a cache when write commands are received including determining whether an address is saved in a cache, in accordance with some embodiments. In one example, the process is implemented by cache manager 113. In one example, the process is implemented by controller 220 to manage scrub data and cache data stored in cache memory 204, 230.

Write commands are received by a controller from a host device. The write commands each make a request to write data at a respective address(es). In response to receiving a write command, the controller writes the new data in the memory array at the corresponding address.

In some embodiments, in response to receiving the write command, the controller may delay writing the new data to the memory array until a later time. For example, the controller may wait until the new data is to be evicted from the cache, and then write the new data to the memory array at that time.

The controller also determines whether the address is stored in the cache. If so, then the existing old data at the address in the cache is evicted. The evicted data could be either scrub data or cache data. Typically, an eviction from the scrub area forces a write to the memory array.

If the controller determines that the address is not in the cache, then the controller writes the new data in the cache without setting the scrub flag.

Figure 12:
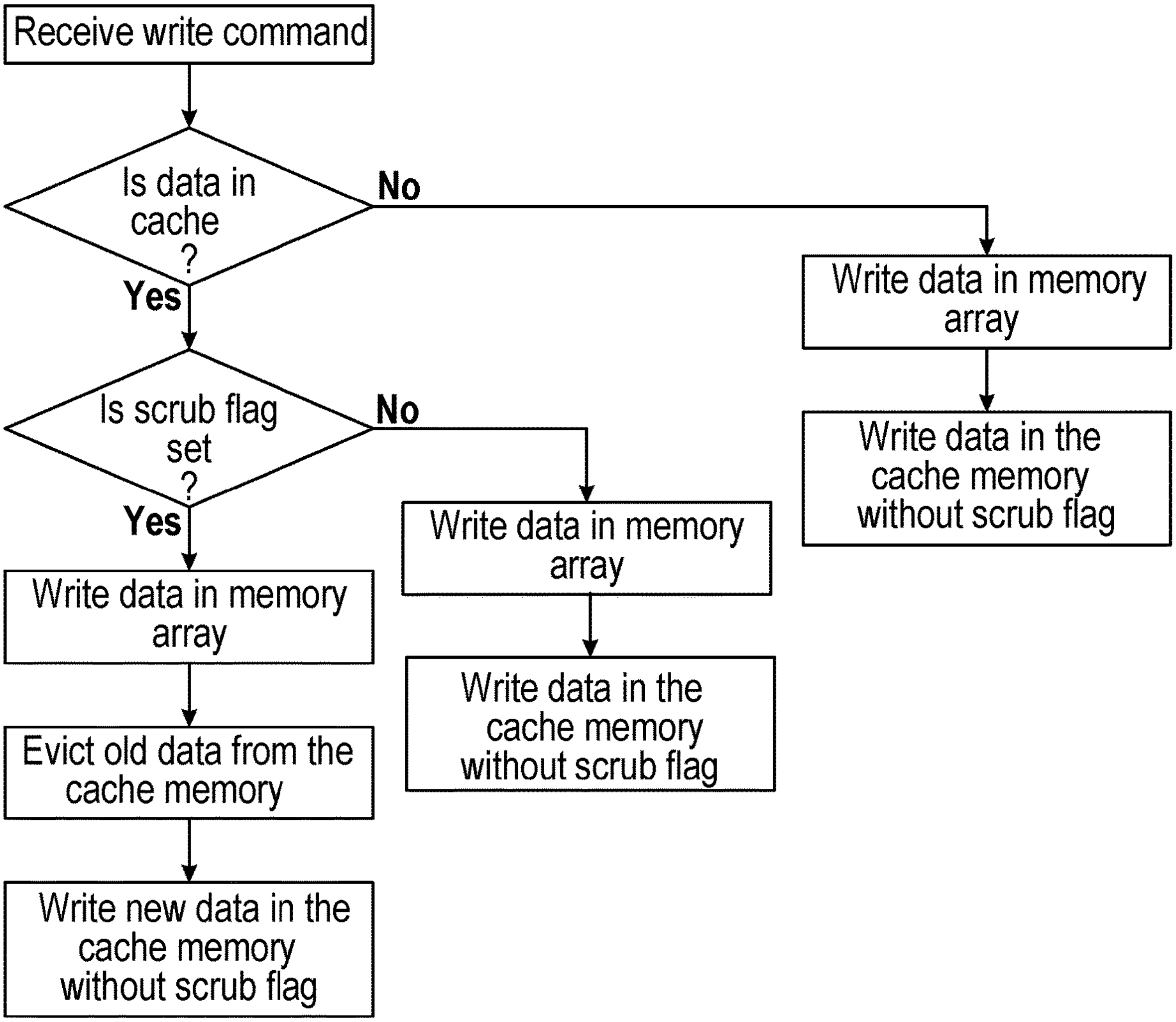
FIG. 12 shows a process for managing a cache when write commands are received including determining whether a scrub flag is set, in accordance with some embodiments.

FIG. 12 shows a process for managing a cache when write commands are received including determining whether a scrub flag is set, in accordance with some embodiments. In one example, the process is implemented by cache manager 113. In one example, the process is implemented by controller 220 to manage scrub data and cache data stored in cache memory 204, 230.

The write commands are received from a host device. Each write command makes a request to write new data at an address. In response to receiving a write command, a controller determines whether there is existing old data in the cache at the address. If not, the controller optionally writes the new data in the memory array. The controller also writes the new data in the cache without setting the scrub flag. In one example of a write cache mechanism, the new data is not written to the memory array. If the write cache is full, and a data is to be evicted and its address is different from the address of the write command, the evicted data is written in the memory array.

If the controller determines that there is existing old data in the cache at the address, the controller determines whether the scrub flag for that old data is set. If the scrub flag is not set, the controller optionally writes the new data in the memory array, and the controller writes the new data in the cache without setting the scrub flag.

If the controller determines that the scrub flag is set, then the controller optionally writes the new data in the memory array. The existing old data at the address is evicted from the cache, and the new data is also written in the cache without setting the scrub flag.

Figure 13:
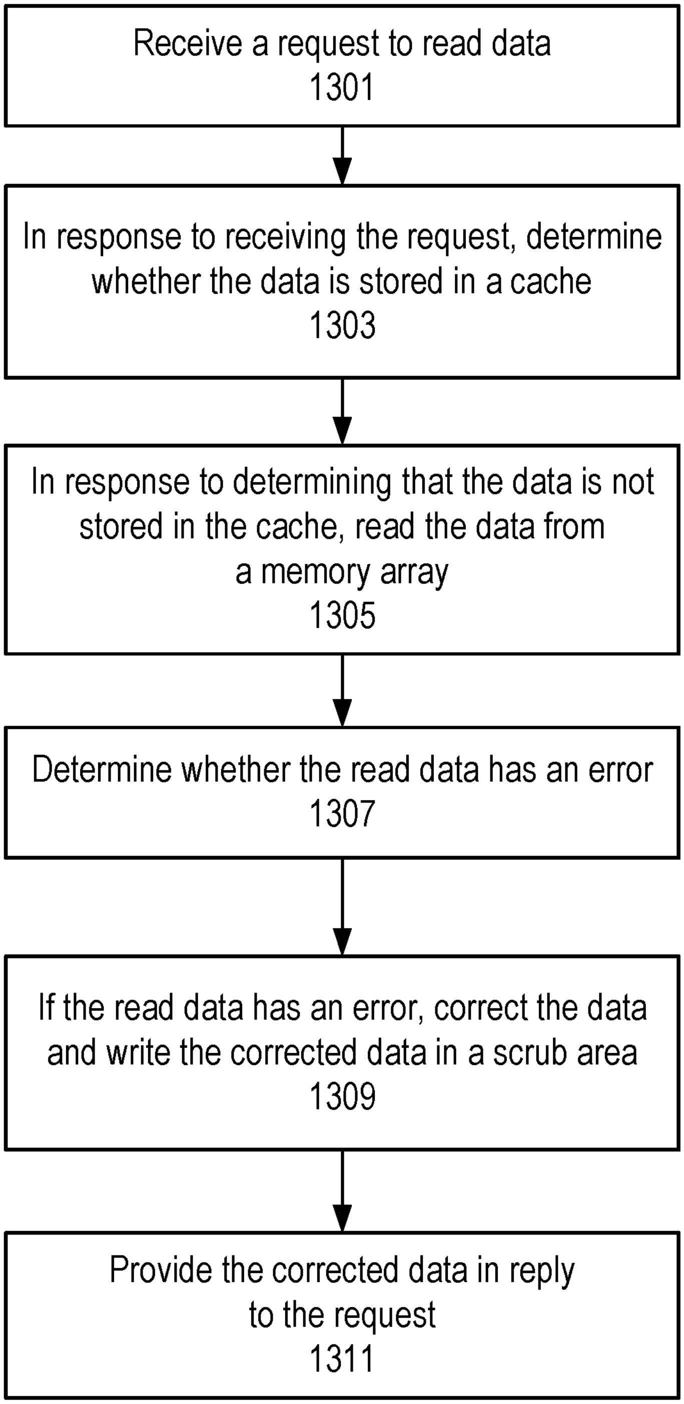
FIG. 13 shows a method for using a cache to store cache data for caching and scrub data for scrubbing, in accordance with some embodiments.

FIG. 13 shows a method for using a cache to store cache data for caching and scrub data for scrubbing, in accordance with some embodiments. For example, the method of FIG. 13 can be implemented in the system of FIG. 2.

The method of FIG. 13 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 13 is performed at least in part by one or more processing devices (e.g., controller 220 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1301, a request to read data is received. In one example, the request is received by controller 220 from host device 226.

At block 1303, in response to receiving the request, a determination is made whether the data is stored in a cache. In one example, controller 220 determines whether an address associated with the request is saved in cache memory 204, 230.

At block 1305, in response to determining that the data is not stored in the cache, the data is read from a memory array. In one example, controller 220 reads the data from the address in memory array 202.

At block 1307, a determination is made whether the read data has an error. In one example, ECC engine 240 determines whether read data is correct using an error correction code (e.g., an ECC stored in memory array 202).

At block 1309, if the read data has an error, the data is corrected. The corrected data is written in a scrub area. In one example, ECC engine 240 corrects the data. Controller 220 writes the corrected data in scrub area 404. In another example, controller 220 writes the corrected data as a new entry 304 in cache 302 with the scrub flag set.

At block 1311, the corrected data is provided in reply to the request. In one example, controller 220 sends the corrected data to host device 226 using host interface 227. The corrected data is sent in reply to a read command from host device 226.

In one embodiment, a system comprises: a memory array (e.g., 202) including memory cells; a cache (e.g., cache memory 204 and/or 230) configured to store data with an indication of whether the data needs correction in the memory array; and a memory controller (e.g., 220) configured to: receive a read command from a host device (e.g., 226) to read first data; in response to receiving the read command, determine whether the first data is stored in the cache; in response to determining that the first data is not stored in the cache, read the first data from the memory array; determine whether the read first data has an error; in response to determining that the read first data has an error, correct the first data; write the corrected first data in the cache with an indication that the first data needs correction in the memory array; and send the corrected first data to the host device.

In one embodiment, the indication of whether the data needs correction in the memory array is a respective flag (e.g., a scrub flag in cache 302) for each of a plurality of addresses in the cache; and the respective flag for each address can be set to indicate a need for data correction, or not set to indicate that data correction is not needed.

In one embodiment, the read command is a first read command, and the controller is further configured to: receive a second read command from the host device to read second data; in response to receiving the second read command, determine whether the second data is stored in the cache; in response to determining that the second data is stored in the cache, read the second data from the cache; and send the second data to the host device.

In one embodiment, the second data in the cache has been previously corrected, and the controller is further configured to: determine a flag is set indicating that the second data stored in the memory array needs correction; and in response to determining that the flag is set, write the corrected second data from the cache to the memory array so that the second data stored in the memory array is correct.

In one embodiment, the second data is sent to the host device within a time window starting from receiving the read command, and the corrected second data is written to the memory array within the time window.

In one example, host device 226 communicates with memory device 201 using a memory bus protocol. In accordance with this protocol, controller 220 sends requested data to host device 226 within a time window starting from the time of receiving a read command that requests the data from host device 226. When requested data is accessed from the cache instead of the memory array, this provides an opportunity to write corrected data to the memory array because the memory array is not being accessed to retrieve the requested data from the memory array.

In one example, read delay is used to write back corrected data to the memory array. Typically, cache memory can be read quickly. For example, only a few nanoseconds are required to access data in an SRAM cache. In one example, the memory device declares itself to have a certain read time. This reflects the time required to access data from physical memory cells in the memory array.

In one example, if data is in a scrub area, then during the corresponding read operation, the physical memory cells are not accessed. Thus, there is a significant portion of the declared read time that is not being used to access physical memory cells. This idle time can be used to write data from the scrub area to the memory cells.

After correcting the data, the corresponding address location is evicted from the scrub area. The location can be moved to the cache area as an option (e.g., the scrub data is moved to cache data). In one example, the scrub flag can simply be reset or cleared. In one example, the address location and scrub data are moved from the scrub area to the cache area.

In one embodiment, the read command is a first read command, and the controller is further configured to: receive a second read command from the host device to read second data; in response to receiving the second read command, determine whether the second data is stored in the cache; in response to determining that the second data is not stored in the cache, read the second data from the memory array; determine whether the read second data has an error; in response to determining that the read second data does not have an error, write the second data in the cache with an indication that the second data does not need correction; and send the second data to the host device.

In one embodiment, the controller is further configured to: determine whether the cache is full; and in response to determining that the cache is full, evict at least one data entry from the cache.

In one embodiment, the first data is stored at an address (e.g., a logical address received with a read command from host device 226) in the memory array, and determining whether the first data is stored in the cache comprises determining whether the address is stored in the cache.

In one embodiment, the controller is further configured to: receive a write command from the host device to write new data at an address; in response to receiving the write command, write the new data in the memory array; determine whether the address is in the cache; in response to determining that the address is in the cache, evict old data from the cache that corresponds to the address; and write the new data in the cache with an indication that the new data does not need correction (e.g., the new data is written to cache area 406).

In one embodiment, the controller is further configured to: determine whether a scrub flag associated with the address is set; wherein the old data is evicted further in response to determining that the scrub flag is set.

In one embodiment, the controller is further configured to: receive a write command from the host device to write new data at an address; in response to receiving the write command, determine that the address is not in the cache; and write the new data in the cache with an indication that the new data does not need correction. The data is written in the memory array only when it will be evicted due to there being too many existing entries in the cache memory.

In one embodiment, the controller is further configured to: receive a write command from the host device to write new data at an address; and in response to receiving the write command, write the new data in the cache with an indication that the new data does not need correction.

In one embodiment, an apparatus comprises: a memory array including memory cells; a cache configured to store addresses, each address having a flag indicating whether data stored at the address in the memory array needs correction, wherein the respective flag is set to indicate a need for correction; and a controller configured to: receive a read command from a host device, the read command requesting data at a first address; in response to receiving the read command, read first data from the memory array at the first address; determine that the read first data has an error; in response to determining that the read first data has an error, store the first address in the cache and set a first flag for the first address (e.g., store the first address as entry 304 in cache 302 with the scrub flag set); and send corrected first data to the host device.

In one embodiment, the controller is further configured to: prior to reading the first data from the memory array, determine whether the first address is stored in the cache; wherein reading the first data from the memory array is further in response to determining that the first address is not stored in the cache.

In one embodiment, the controller is further configured to: perform a scrubbing process that determines addresses in the cache having a flag set, wherein the scrubbing process determines that a first flag of the first address is set; in response to determining that the first flag is set, write corrected first data in the memory array at the first address; and in response to writing corrected first data in the memory array, clear the first flag.

In one embodiment, the cache is further configured to store respective data for each address stored in the cache.

In one embodiment, the apparatus further comprises an error correction code engine (e.g., ECC engine 240), wherein the respective data stored for each address having a flag set has been corrected using the error correction code engine.

In one embodiment, the cache is further configured so that eviction of each address having a flag set requires that corrected data is written in the memory array at the respective address.

In one embodiment, a method comprises: receiving a request (e.g., a read command) to read first data; in response to receiving the request, determining whether the first data is stored in a scrub area (e.g., scrub area 404) or a cache area (e.g., cache area 406) of a cache memory; in response to determining that the first data is not stored in either of the scrub area or the cache area, reading the first data from a memory array; determining, based on whether the read first data has an error, whether to write the read first data in the scrub area or the cache area; in response to determining that the read first data has an error, correcting the first data and writing the corrected first data in the scrub area; and providing the corrected first data in reply to the request.

In one embodiment, the request is a first request, and the method further comprises: receiving a second request to read second data; in response to receiving the second request, determining whether the second data is stored in the scrub area or the cache area; in response to determining that the second data is stored in one of the scrub area or the cache area, reading the second data from the one of the scrub area of the cache area; and providing the read second data in reply to the second request.

In one embodiment, the request is a first request, and the method further comprises: receiving a second request to read second data; determining that the second data has an error; and in response to determining that the second data has an error, correcting the second data and writing the corrected second data in the scrub area.

In one embodiment, the request is a first request, and the method further comprises: receiving a second request to read second data; determining that the second data does not have an error; and in response to determining that the second data does not have an error, writing the second data in the cache area.

In one embodiment, if an error is identified during a read, then the address of the read memory cell(s) is saved in a scrub list for future correction. In one approach, only the address is saved. In another approach, the address and the clean (correct) value is saved.

In one embodiment, data eviction is used to handle the situation of the scrub list becoming full due to hitting a quantity limit. Data addresses in a cache area can be evicted without further action. Data addresses in a scrub area must be cleaned before being evicted.

In one embodiment, addresses in a merged cache list can be associated with either caching or scrubbing. A scrub flag is used to track whether the address and data are from the scrub list. In one example, the merged cache is stored in SRAM. An extra bit is added to each entry in the SRAM memory as a scrub flag. In the cache, the data structure has a field for the address, a field for the data, and a field for the extra bit.

In one example, the cache is on the same die as the memory array. In one example, the cache is on a separate memory die (e.g., SRAM or DRAM).

In one embodiment, a scrub flag is used to distinguish two areas in the same memory (e.g., cache area and scrub area). In one approach, the entries in a list are placed anywhere in the list and only the flag is used to distinguish between the scrub area and the cache area.

In one example, a cache memory can be filled from two ends. A scrub area can be on the top, and a cache area can be on the bottom.

In one example, a border is used between scrub and cache areas. The border can be flexible and moved during operation by the controller. For example, the border can be moved up and down depending on where data is evicted. In one example, for cache data entries, the oldest data is evicted from the bottom (e.g., for FIFO operation).

In one example, when doing a read operation, the scrub area is checked to see if the data is already available, without needing to read from the physical memory cells of the memory array. The data in the scrub area is correct data because the ECC engine previously corrected the data value before being written in the scrub area.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:

a cache; and a memory controller configured to:

in response to receiving a first read command requesting a second data set, determine that the second data set is not stored in the cache, and read the second data set from a memory array;

in response to determining that the second data set read from the memory array has an error, correct the second data set, store the corrected second data set in the cache, and set a flag for the second data set; and in response to receiving a second read command requesting the second data set, determine that the second data set is stored in the cache, determine the flag is set, write the corrected second data set from the cache to the memory array, and read the corrected second data set from the cache.

2. The apparatus of claim 1, wherein the controller is further configured to:

receive the second read command from a host device; and send the second data set to the host device.

3. The apparatus of claim 2, wherein the second data set is sent to the host device within a time window starting from receiving the second read command, and the second data set is written to the memory array within the time window.

4. The apparatus of claim 1, wherein the controller is further configured to:

receive a third read command from a host device to read a third data set;

in response to receiving the third read command, determine whether the third data set is stored in the cache;

in response to determining that the third data set is not stored in the cache, read the third data set from a memory array;

determine whether the read third data set has an error;

in response to determining that the read third data set does not have an error, write the third data set in the cache with an indication that the third data set does not need correction; and send the third data set to the host device.

5. The apparatus of claim 1, wherein the controller is further configured to:

determine whether the cache is full; and in response to determining that the cache is full, evict at least one data entry from the cache.

6. The apparatus of claim 1, wherein the second data set is stored at an address in the memory array, and the controller is further configured to determine whether the second data set is stored in the cache by determining whether the address is stored in the cache.

7. The apparatus of claim 1, wherein the controller is further configured to:

receive a write command from a host device to write a new data set;

write the new data set at an address in the memory array;

determine whether the address is in the cache;

in response to determining that the address is in the cache, evict an old data set from the cache that corresponds to the address; and write the new data set in the cache with an indication that the new data set does not need correction.

8. The apparatus of claim 7, wherein the controller is further configured to determine whether a scrub flag associated with the address is set.

9. The apparatus of claim 1, wherein the controller is further configured to:

receive a write command from a host device to write a new data set at an address;

in response to receiving the write command, determine that the address is not in the cache; and write the new data set in the cache with an indication that the new data set does not need correction.

10. The apparatus of claim 1, wherein the controller is further configured to:

receive a write command from a host device to write a new data set at an address; and in response to receiving the write command, write the new data set in the cache with an indication that the new data set does not need correction.

11. An apparatus comprising:

a cache; and a controller configured to:

determine that a first data set read from a memory array has an error, correct the first data set, store the corrected first data set in the cache, and set a scrub flag for the first data set;

receive a read command from a host device, the read command requesting the first data set;

in response to receiving the read command, determine the first data set is stored in the cache and that the scrub flag for the first data set is set;

in response to determining that the scrub flag is set, write back the corrected first data set from the cache to the memory array;

read the corrected first data set from the cache; and send the corrected first data set to the host device.

12. The apparatus of claim 11, wherein the cache is further configured to store respective data for each address stored in the cache.

13. The apparatus of claim 12, further comprising an error correction code engine, wherein the respective data stored for each address having a flag set has been corrected using the error correction code engine.

14. The apparatus of claim 11, wherein the cache is further configured so that eviction of each address having a flag set requires that corrected data is written in a memory array at the respective address.

15. A method comprising:

in response to determining that a first data set read from a memory array has an error, correcting the first data set;

storing the corrected first data set in a scrub area of a cache memory;

receiving a request to read the first data set;

in response to determining that the first data set is stored in the scrub area, writing back the corrected first data set from the scrub area to the memory array; and providing the corrected first data set from the scrub area in reply to the request.

16. The method of claim 15, wherein the request is a first request, the method further comprising:

receiving a second request to read a second data set;

in response to receiving the second request, determining whether the second data set is stored in the scrub area or a cache area;

in response to determining that the second data set is stored in one of the scrub area or the cache area, reading the second data set from the one of the scrub area or the cache area; and providing the read second data set in reply to the second request.

17. The method of claim 15, wherein the request is a first request, the method further comprising:

receiving a second request to read a second data set;

determining that the second data set has an error;

in response to determining that the second data set has an error, correcting the second data set and writing the corrected second data set in the scrub area; and providing the corrected second data set in reply to the second request.

18. The method of claim 15, wherein the request is a first request, the method further comprising:

receiving a second request to read a second data set;

reading the second data set;

determining that the second data set does not have an error;

in response to determining that the second data set does not have an error, writing the second data set in a cache area of the cache memory; and providing the read second data set in reply to the second request.

* * * * *